US009097418B2

(12) United States Patent
Rancruel et al.

(10) Patent No.: US 9,097,418 B2
(45) Date of Patent: Aug. 4, 2015

(54) SYSTEM AND METHOD FOR HEAT RECOVERY STEAM GENERATORS

(71) Applicant: General Electric Company, Schenectady, NY (US)

(72) Inventors: Diego Fernando Rancruel, Greenville, SC (US); Drake Joseph Viscome, Greenville, SC (US); Elizabeth Angelyn Fadde, Greenville, SC (US); Ashlee Nicole Atwell, Simpsonville, SC (US); Kyle Joseph Conger, Greenville, SC (US)

(73) Assignee: General Electric Company, Schenectady, NY (US)

( * ) Notice: Subject to any disclaimer, the term of this patent is extended or adjusted under 35 U.S.C. 154(b) by 221 days.

(21) Appl. No.: 13/759,993

(22) Filed: Feb. 5, 2013

(65) Prior Publication Data

US 2014/0216365 A1    Aug. 7, 2014

(51) Int. Cl.
| | |
|---|---|
| *F22G 5/00* | (2006.01) |
| *F22G 1/00* | (2006.01) |
| *F22D 5/00* | (2006.01) |
| *F22B 1/18* | (2006.01) |
| *F22B 35/00* | (2006.01) |

(52) U.S. Cl.
CPC ............... *F22G 1/00* (2013.01); *F22B 1/1815* (2013.01); *F22B 35/007* (2013.01); *F22D 5/00* (2013.01); *Y02E 20/16* (2013.01); *Y02E 20/18* (2013.01)

(58) Field of Classification Search
CPC .......... F22B 35/10; F22B 35/104; F01K 3/22; F01K 17/24; F22G 5/00
USPC ....... 122/1 B, 1 C, 7 R, 406.4, 409, 424, 425, 122/448.1, 448.4, 460, 461, 470, 477, 122/479.7; 60/645, 772, 783, 657, 804, 60/39.182
See application file for complete search history.

(56) References Cited

U.S. PATENT DOCUMENTS

| | | | | | |
|---|---|---|---|---|---|
| 3,769,795 | A | * | 11/1973 | Rostrom | 60/665 |
| 4,858,562 | A | * | 8/1989 | Arakawa et al. | 122/7 R |
| 5,628,179 | A | * | 5/1997 | Tomlinson | 60/783 |
| 5,660,799 | A | * | 8/1997 | Motai et al. | 422/112 |
| 5,775,266 | A | * | 7/1998 | Ziegler | 122/7 R |
| 5,924,389 | A | * | 7/1999 | Palkes et al. | 122/7 R |
| RE36,524 | E | * | 1/2000 | Tomlinson | 60/783 |
| 6,189,491 | B1 | | 2/2001 | Wittchow et al. | |
| 6,363,711 | B2 | * | 4/2002 | Schmid et al. | 60/39.182 |
| 6,604,354 | B2 | * | 8/2003 | Oto et al. | 60/39.182 |
| 6,829,898 | B2 | * | 12/2004 | Sugishita | 60/772 |
| 7,243,618 | B2 | * | 7/2007 | Gurevich | 122/7 R |
| 7,270,086 | B2 | * | 9/2007 | Franke et al. | 122/7 R |
| 7,281,499 | B2 | * | 10/2007 | Franke et al. | 122/406.5 |

(Continued)

OTHER PUBLICATIONS

U.S. Appl. No. 13/759,985, filed Feb. 5, 2013, Diego Fernando Rancruel.

*Primary Examiner* — Gregory A Wilson
(74) *Attorney, Agent, or Firm* — Fletcher Yoder, P.C.

(57) ABSTRACT

A system includes a heat recovery steam generator (HRSG) including a plurality of evaporator sections. At least one evaporator section includes a natural circulation evaporator configured to generate a saturated steam, a once-through evaporator configured to generate a first superheated steam, a first superheater configured to receive the saturated steam from the natural circulation evaporator, and a second superheater configured to receive the first superheated steam from the once-through evaporator.

23 Claims, 2 Drawing Sheets

(56) References Cited

U.S. PATENT DOCUMENTS

| | | |
|---|---|---|
| 7,445,652 B2 | 11/2008 | Bax |
| 8,220,274 B2 * | 7/2012 | Bono et al. .................. 60/772 |
| 2001/0022077 A1 * | 9/2001 | Hannemann et al. ...... 60/39.182 |
| 2011/0247335 A1 * | 10/2011 | Schmid et al. ................. 60/676 |
| 2012/0180739 A1 * | 7/2012 | Rop et al. ..................... 122/7 R |
| 2013/0098313 A1 * | 4/2013 | Pang ............................ 122/460 |

\* cited by examiner

SYSTEM AND METHOD FOR HEAT RECOVERY STEAM GENERATORS

BACKGROUND OF THE INVENTION

The subject matter disclosed herein relates to operating heat exchangers, and more particularly, to systems and methods for operating heat recovery steam generators.

Heat exchangers are used to transfer heat from one medium to another in a variety of industries. A heat recovery steam generator (HRSG) is an example of a heat exchanger that may be used in combined cycle power plants and similar plants. An HRSG may use gas turbine engine exhaust to heat a fluid flowing through heat exchangers in the HRSG, for example, to convert water into steam. In some configurations, the fluid may be steam used for high-pressure, intermediate-pressure, and/or low-pressure sections of a steam turbine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a heat recovery steam generator (HRSG) including a plurality of evaporator sections. At least one evaporator section includes a natural circulation evaporator configured to generate a saturated steam, a once-through evaporator configured to generate a first superheated steam, a first superheater configured to receive the saturated steam from the natural circulation evaporator, and a second superheater configured to receive the first superheated steam from the once-through evaporator.

In a second embodiment, a method includes generating a saturated steam using a natural circulation evaporator in an evaporator section of an HRSG, generating a first superheated steam using a once-through evaporator in the evaporator section of the HRSG, generating a second superheated steam superheating the saturated steam from the natural circulation evaporator, and generating a third superheated steam by superheating the first superheated steam from the once-through evaporator.

In a third embodiment, a system includes instructions disposed on a non-transitory, machine readable medium. The instructions are configured to control a heat recovery steam generator (HRSG) to generate a first superheated steam by superheating a first steam generated from a natural circulation evaporator, generate a second superheated steam by superheating a second steam generated from a once-through evaporator, and mix the first superheated steam and the second superheated steam in an attemperator to generate a third superheated steam.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
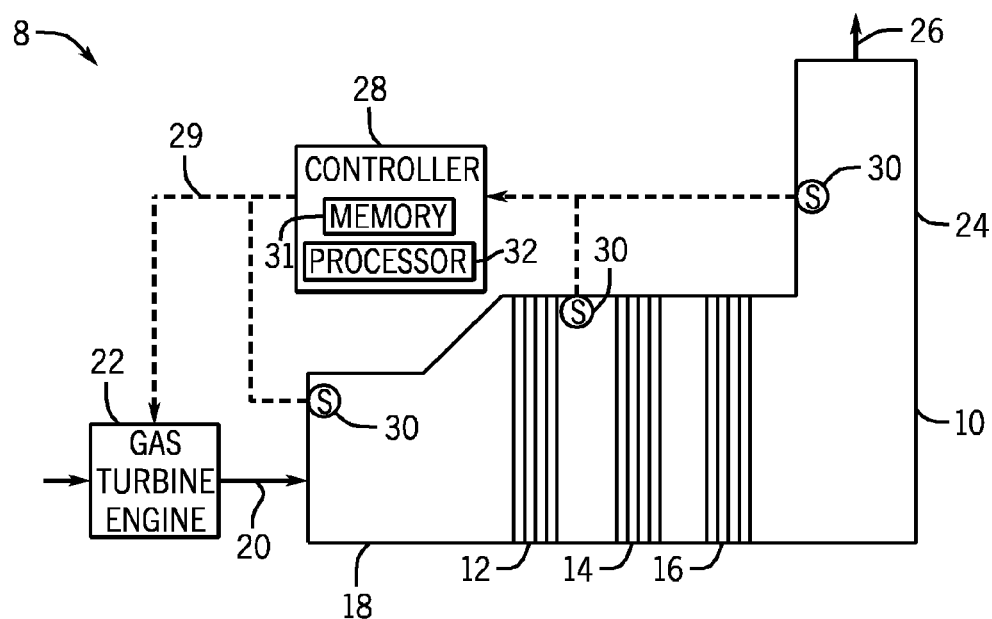
FIG. 1 is a schematic diagram of an embodiment of an HRSG.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide systems and methods for operating an HRSG. For example, a system may include an HRSG including a natural circulation evaporation section, a once-through evaporator, and independent superheaters configured to superheat the steam produced by each evaporator section. In a natural circulation evaporator, circulating water from a steam drum is partially evaporated after passing through the heated evaporator tubes. The generated steam is separated in the steam drum, and then the remaining water is recirculated to the same heated tubes for further evaporation. In a once-through evaporator, the transition from liquid to superheated steam takes place in one pass. As such, a once-through evaporator does not use the steam separating drum and water recirculation of a natural-circulation evaporator, thereby providing a potentially faster response to cycles in the gas turbine engine.

Furthermore, because independent superheaters are coupled to the natural circulation evaporator and the once-through evaporator, the two evaporator sections may run with independent operational settings, allowing increased operational flexibility and possibly higher efficiency. For example, the natural circulation evaporator may run efficiently at one pressure, while the once-through evaporator may run efficiently at a different pressure. With independent superheaters, the two evaporator sections need not run at the same pressure. The system may also include an attemperator, which attemperates the steam from the once-through section with the steam from the natural circulation evaporator, which allows the two steams to be mixed and fed to a possible final superheater and the steam turbine. Attemperation may refer to the control of a temperature of a first steam by contacting the first steam with water or a second steam at a temperature or pressure different than the first steam. Mixing steam from each type of evaporator after passing through independent superheaters allows for controls closer to the exit of the HRSG, which may result in faster response to the exit properties of the steam and possible higher efficiency.

FIG. 1 is a block diagram of an embodiment of a system 8 that includes an HRSG 10 with one or more HRSG sections (e.g. evaporator sections), each having a plurality of independent superheaters. As shown in FIG. 1, the HRSG 10 includes a high-pressure evaporator section 12, an intermediate-pressure evaporator section 14, and a low-pressure evaporator section 16. The high-pressure evaporator section 12 generates high-pressure steam, the intermediate-pressure evaporator section 14 generates intermediate-pressure steam, and the low-pressure evaporator section 16 generates low-pressure steam. Each section, 12, 14, and 16, is a heat exchanger that generates steam by transferring heat from the heated exhaust gas 20 to water or steam. As discussed in detail below, each of the sections, 12, 14, and 16, may include a natural circulation evaporator, a once-through evaporator, a first superheater connected to the natural circulation evaporator, and a second superheater connected to the once-through evaporator. The two independent superheaters may allow the natural circulation evaporator and the once-through evaporator to operate under different conditions (e.g., pressure) which may lead to higher efficiency of the HRSG 10. The high-pressure section 12 is located near an inlet section 18 of the HRSG 10. As the temperature of heated exhaust gas 20 from a gas turbine engine 22 may be highest near the high-pressure section 12, the high-pressure section generates high-pressure steam. In other words, the high temperature of the heated exhaust gas 20 near the high-pressure section 12 provides sufficient heat to produce the high-pressure steam. The heated exhaust gas 20 from the gas turbine engine 22 enters the HRSG 10 in the inlet section 18. After the heated exhaust gas passes through the high-pressure section 12, the intermediate-pressure section 14, and the low-pressure section 16, a cooled exhaust gas 26 exits HRSG 10 from an HRSG stack 24. Thus, the cooled exhaust gas 26 may exit from the HRSG stack 24 into the atmosphere. In other embodiments, the intermediate-pressure section 14 may be omitted or the HRSG 10 may be configured as a single-pressure system.

In certain embodiments, the system 8 may include a controller 28, having memory 31 and a processor 32, which may be used to control certain aspects of the system 8. For example, the controller 28 may send or receive signals 29 from one or more sensors 30 disposed in the HRSG 10. In certain embodiments, the sensors 30 may be disposed in the inlet section 18, adjacent to one or more of the high-pressure section 12, intermediate-pressure section 14, or low-pressure section 16, or in the HRSG stack 24. The sensors 30 may measure various conditions or parameters of the HRSG 10, such as, but not limited to, a level of an unburnt fuel, a level of oxygen, a level of emissions (e.g., carbon monoxide, nitrogen oxides, sulfur oxides, or any combination thereof), a temperature, a flow rate, a pressure, or any combination thereof. More specifically, the controller 28 may use the information received from the sensors 30 to generate and send signals 29 to one or more components of the system 8. For example, the controller 28 may send or receive signals 29 from the natural circulation evaporator, the once-through evaporator, or the independent superheater. Furthermore, the controller 28 may send or receive signals 29 from the gas turbine engine 22, or another part of the system 8.

Figure 2:
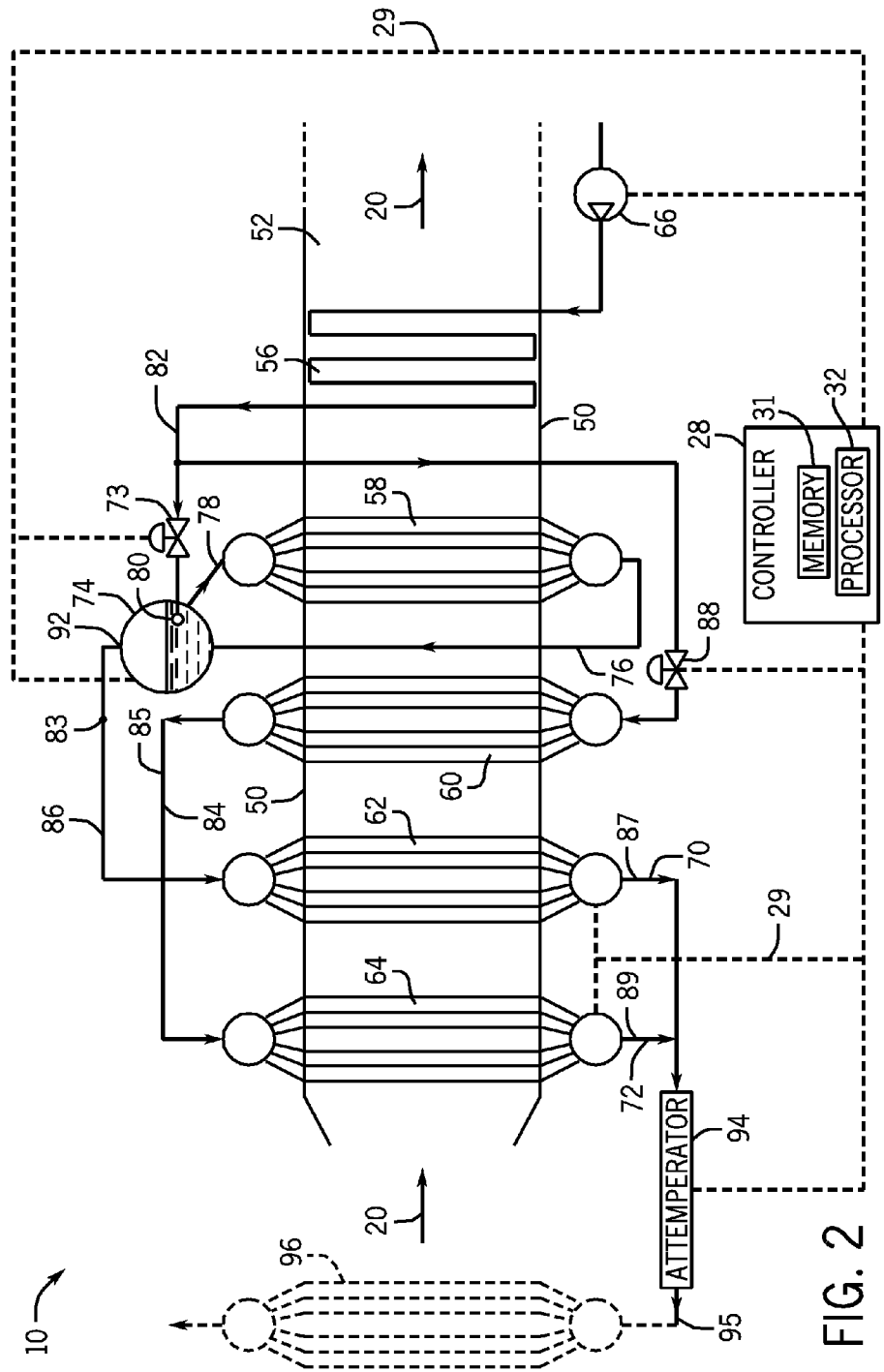
FIG. 2 is a schematic diagram of a portion of an embodiment of an HRSG having a natural circulation evaporator, a once through evaporator, a first superheater, and a second superheater.

FIG. 2 is a schematic diagram of a portion of an embodiment of the HRSG 10. For example, FIG. 2 may represent at least one of the evaporator sections 12, 14, or 16. In certain embodiments, the HRSG 10 includes at least one evaporator that relies on natural circulation and another evaporator that is a once-through section. In certain embodiments, the outlet pressure of the evaporators may be the same, and in other embodiments the outlet pressures may be different. As shown in FIG. 2, the HRSG 10 includes an economizer 56, a natural circulation evaporator 58, a once-through evaporator 60, a first independent superheater 62, and a second independent superheater 64. The HRSG 10 has enclosing walls 50, which form a heating gas duct 52 through which the heating gas from the gas turbine engine 22 flows in the direction indicated by arrows 20. Additionally, there is a steam separating drum 74, a feed water pump 66, and an attemperator 94.

Feed water passes through the feed water pump 66 to provide a controlled water supply to the economizer 56. The feed water may come from a condenser, where steam coming from the steam turbine at low pressure and low temperature is condensed. It may be stored, preheated, and conditioned in a feed water tank before being sent to the economizer 56 by the feed water pump 66. In certain embodiments, the feed water pump 66 may be a variable frequency pump, which may provide feed water at different flow rates by adjusting the speed of the motor coupled to the pump 66. The economizer 56 may preheat the feed water with the enthalpy of fluid streams that are not hot enough to be used in an evaporator. The economizer 56 recovers useful heat from the system 8, thereby increasing its efficiency. After exiting the economizer 56, a feed water line 82 splits, allowing water to flow through a first control valve 73 or a second control valve 88. Feed water flowing through the first control valve 73 passes through a drum water inlet 80 and into a steam separating drum 74. The first control valve 73 maintains the water level of the steam separating drum 74 under all loads. In other words, if the level of the steam separating drum 74 falls below a threshold, the first control valve 73 may open further to allow additional feed water into the steam separating drum 74. Similarly, if the level of the steam separating drum 74 rises above a threshold, the first control valve 73 may close further to allow less feed water into the steam separating drum 74. More specifically, the heated water from the steam drum 74 is transported by natural circulation through downcomers 78 into the heated tubes of the natural circulation evaporator 58, where the water heats to a saturation temperature, evaporates, and is returned to the drum 74 through risers 76 as a steam water mixture. A saturated steam 83 is separated from hot water in the drum 74, and exits through the drum steam outlet 92. The saturated steam 83 enters the first independent superheater 62 through the first inlet steam line 86. The natural circulation evaporator 58 may use vertical heating tubes. As the feed water boils, bubbles will rise and cause circulation, facilitating the separation of the liquid and vapor at the top of the heating tubes. The circulating feed water may be partly evaporated when passing through the evaporator 58 tubes, so water that is not evaporated is returned to the steam separating drum 74. Thus, feed water may be fed through the evaporator 58 tubes multiple times before fully evaporating.

Alternatively, water from the feed water pump 66 may flow from the economizer 56 to the second control valve 88, and into the once-through evaporator 60, located upstream of the natural circulation evaporator 58. Because the once-through evaporator 60 is disposed upstream of the natural circulation evaporator 58 with respect to the heated exhaust gas 20 flowing through the duct 52, the once-through evaporator 60 is exposed to higher temperature heated exhaust gas 20, which contributes to its production of a slightly superheated steam compared to the saturated steam 83 produced by the natural circulation evaporator 58. The natural circulation evaporator 58 is exposed to lower temperature heated exhaust gas 20 than the once-through evaporator 60, so it has less heat transfer in the heating surfaces of the evaporator. For this reason, the natural circulation evaporator 58 may produce less steam than the once-through evaporator 60. The interaction between the first control valve 73 and the feed water pump 66 determines the flow of water to the once-through evaporator 60 of the HRSG 10. For example, if the level of the steam separating drum 74 falls below a threshold, the speed of the variable frequency feed water pump 66 may be increased in order to raise the level. Alternately, if the level of the steam separating drum 74 rises above a threshold, the speed of the variable frequency feed water pump 66 may be decreased.

The natural circulation evaporator 58 produces saturated steam 83, and the once-through evaporator 60 generates a first superheated steam 85. The saturated steam 83 from steam separating drum 74 flows through a first inlet steam line 86 to the first independent superheater 62, where it is superheated to produce a second superheated steam 87. The first superheated steam 85, produced by the once-through evaporator 60, is carried by a second inlet steam line 84 to the second independent superheater 64. The second independent superheater 64 produces a third superheated steam 89. The second superheated steam 87 exits the first independent superheater 62 via a first outlet line 70. The third superheated steam 89 exits the second independent superheater 64 via a second outlet line 72. The first and second outlet lines 70 and 72 enter the attemperator 94, which generates a fourth superheated steam 95. The attemperator 94 allows for more robust control of the heated exhaust temperature of the fourth superheated steam 95 by the independent superheaters 62 and 64. Specifically, the attemperator 94 may be configured to control the temperature of the fourth superheated steam 95 by using the steam 83 from the natural circulation evaporator 58 to attemperate the steam 85 from the once-through evaporator 60 to produce a fourth superheated steam 95. Because the natural circulation evaporator 58 is located downstream of the heated exhaust flow 20 in the boiler duct 54 with respect to the once-through evaporator 60, the natural circulation evaporator 58 has a lower temperature when exposed to a lower temperature heated exhaust gas 20, and produces lower temperature steam than the once-through evaporator 60. In contrast, the once-through evaporator 60 generates superheated steam. Because of this temperature difference, the two steams may be used to temper each other to reach a pre-determined temperature or temperature range using the attemperator 94. Once attemperated, the fourth superheated steam 95 may be used elsewhere in the system 8, or may be further superheated by an optional final superheater 96, which may superheat the fourth superheated steam 95 before it is used downstream in the steam turbine, for example by a steam turbine.

Using the second superheated steam 83 and the third superheated steam 85 to attemperate each other may be more efficient than attemperating by injecting cold feed water spray into the superheated stream. By utilizing the steam 83 and 85 to attemperate each other to produce a single final steam at a desired temperature, a high thermal gradient may be minimized, thereby reducing possible damage to equipment. Furthermore, energy loss resulting from mixing the steams 83 from the natural circulation evaporator 58 and the steam 85 from the once-through evaporator 60, which have different conditions, may be avoided by attemperation, thereby allowing a more efficient recovery of available heat.

In the once-through evaporator 60, the feed water is evaporated and the steam is superheated in the heated evaporator 60 tubes without fluid recirculation or the use of a separating drum, such as steam separation drum 74. Thus, in contrast to the natural circulation evaporator 58, the once-through evaporator 60 does not utilize downcomers or a drum. Because the once-through team does not utilize a steam separating drum, which involves preheating, the once-through evaporator 60 may have a faster start-up time than the natural circulation evaporator 58.

In certain embodiments, the HRSG 10 may include the controller 28, having memory 31 and a processor 32, which may be used to control certain aspects of the HRSG 10. The controller 28 may send or receive signals 29 from one or more sensors 30, shown in FIG. 1, disposed in the HRSG 10. For example, sensors 30 may be disposed at the outlet of independent superheaters 62 and 64, at valve 88, at feed water pump 66, at valve 73, and in the steam separating drum 74. The sensors 30 may sense a level of an unburnt fuel, a level of oxygen, a level of emissions (e.g., carbon monoxide, nitrogen oxides, sulfur oxides, or any combination thereof), a temperature, a flow rate, a pressure, a water level, humidity, or any combination thereof. The controller 28 may use the information received from the sensors 30 to generate and send signals 29 to one or more components of the HRSG 10. Specifically, the controller 28 may send signals 29 to the attemperator 94, the feed water pump 66, the valve 88, or valve 73. Additionally, the control valves 73 and 88 can be managed by the controller 28, which distributes the water flow between the evaporator sections 58 and 60 depending on the water level in the steam drum 74 and the steam temperature in the first inlet steam line 86, or at some other point downstream of the evaporators 58 and 60. For example, if the sensors 30 detect a temperature above a certain threshold value in the first inlet steam line 86, the control valve 88 may supply less feed water to the once-through evaporator 60. Because the once-through evaporator 60 produces a hotter steam that the natural circulation evaporator 58, reducing the flow of feed water to that evaporator may lower the temperature of the fourth superheated steam, and may be configured to control a level in the separating steam drum 74.

Instructions for the controller 28 may be disposed on a non-transitory, machine readable medium (e.g., memory 31), which may allow the controller 28 to control the HRSG 10. These instructions may control the HRSG to generate a first superheated steam by superheating a first steam generated from a natural circulation evaporator, generate a second superheated steam by superheating a second steam generated from a once-through evaporator, and mix the first superheated steam and the second superheated steam in an attemperator to generate a third superheated steam. The instructions may also be configured to maintain a temperature of the third superheated steam above a threshold by adjusting at least one of a first flow rate of the first superheated steam, or a second flow rate of the second superheated steam, or a combination thereof. Furthermore, the instructions may be configured to generate a fourth superheated steam by superheating the third superheated steam, and may be configured to control a level in the steam separating drum 74.

The system 8 or HRSG 10 may form a part of an integrated gasification combined cycle (IGCC) power plant. An IGCC power plant converts a fuel source into syngas through the use of a gasifier. An IGCC gasifier may combine a fuel source (e.g., a coal slurry) with steam and oxygen to produce the syngas. The product syngas may be provided to a combustor to combust the syngas with oxygen to drive one or more gas turbine engines. Heat from the IGCC power plant may be used to generate steam to drive one or more steam turbines. For example, the hot exhaust gases may be used to generate steam in the HRSG 10 that is then used to drive a steam turbine, which may be connected to a load to generate electricity.

As discussed above, embodiments of the HRSG 10 allow for a flexible evaporator section (e.g., 12, 14, or 16) that can meet the demands of fast response combined cycle power plants. Specifically, the evaporator section may include an economizer 56, a natural circulation evaporator 58, a once-through evaporator 60, a first independent superheater 62, and a second independent superheater 64. Additionally, there may be a steam separating drum 74, a feed water pump 66, and an attemperator 94. Faster start-up times may provide more operational flexibility than HRSG's that only include natural circulation type evaporators, which require longer start-up times in order to pre-heat the steam separating drum. This technology can be applied to the high-pressure section 12, intermediate-pressure section 14, or low-pressure section 16, or any combination thereof, of the system 8. Attemperating steam from independent superheaters (e.g., 62 and 64) allows for controls closer to the exit of the HRSG 10, resulting in faster response to the exit properties of the steam. The HRSG 10 can also operate at two pressures, since the natural circulation evaporator 58 and the once-through evaporator 60 act independently from one another. This may increase operational flexibility and efficiency of the system 8. Furthermore, the hybrid HRSG 10 with independent superheaters 62 and 64 may reduce the size and wall thickness of the steam separating drum 74, as compared to an HRSG 10 that uses only natural circulation evaporators, since part of the steam is produced by a once-through evaporator 60, which does not use a steam separating drum 74. By using a once-through evaporator 60 and a natural circulation evaporator 58, the overall size of the HRSG 10 may be reduced, since the size of the steam separating drum 74 may be reduced. Additionally, the use of independent superheaters 62 and 64 reduces energy loss from mixing steams of different conditions, allowing better recovery of available heat and thereby increasing operational capability.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a heat recovery steam generator (HRSG), comprising:
        a plurality of evaporator sections, wherein at least one of the plurality of evaporator sections comprises:
            a natural circulation evaporator configured to generate a saturated steam;
            a once-through evaporator configured to generate a first superheated steam;
            a first superheater configured to receive the saturated steam from the natural circulation evaporator and generate a second superheated steam; and
            a second superheater configured to receive the first superheated steam from the once-through evaporator and generate a third superheated steam, wherein HRSG comprises at least one of a plurality of features comprising:
        an attemperator configured to attemperate the third superheated steam with the second superheated steam to generate a fourth superheated steam; or
        each of first and second superheaters is disposed upstream of both the natural circulation evaporator and the once-through evaporator; or
        a controller configured to independently control a first flow through the natural circulation evaporator and the first superheater and a second flow through the once-through evaporator and the second superheater; or
        any combination thereof.

2. The system of claim 1, wherein the HRSG comprises at least one of a high-pressure evaporator section, an intermediate-pressure evaporator section, or a low-pressure evaporator section, or a combination thereof.

3. The system of claim 1, wherein the once-through evaporator is disposed upstream of the natural circulation evaporator.

4. The system of claim 1, wherein the second superheater is disposed upstream of the first superheater.

5. The system of claim 1, wherein the HRSG comprises at least two of the plurality of features.

6. The system of claim 1, comprising the attemperator configured to attemperate the third superheated steam with the second superheated steam to generate the fourth superheated steam.

7. The system of claim 6, comprising a third superheater configured to superheat the fourth superheated steam.

8. The system of claim 1, comprising an integrated gasification combined cycle (IGCC) power plant having the HRSG.

9. The system of claim 1, wherein each of the first and second superheaters is disposed upstream of both the natural circulation evaporator and the once-through evaporator.

10. The system of claim 1, comprising the controller configured to independently control the first flow through the natural circulation evaporator and the first superheater and the second flow through the once-through evaporator and the second superheater.

11. A method, comprising:
    generating a saturated steam using a natural circulation evaporator disposed in an evaporator section of a heat recovery steam generator (HRSG);
    generating a first superheated steam using a once-through evaporator disposed in the evaporator section of the HRSG;
    generating, via a first superheater, a second superheated steam by superheating the saturated steam from the natural circulation evaporator; and
    generating, via a second superheater, a third superheated steam by superheating the first superheated steam from the once-through evaporator, wherein the method comprises at least one of a plurality of features comprising:
    attemperating the third superheated steam with the second superheated steam in an attemperator to generate a fourth superheated steam; or
    receiving a heated flow through first regions having the first and second superheaters upstream of second regions having the natural circulation evaporator and the once-through evaporator; or
    independently controlling a first flow through the natural circulation evaporator and the first superheater and a second flow through the once-through evaporator and the second superheater; or
    any combination thereof.

12. The method of claim 11, comprising independently controlling the first flow through the natural circulation evaporator and the first superheater and the second flow through the once-through evaporator and the second superheater.

13. The method of claim 11, wherein the once-through evaporator is disposed upstream of the natural circulation evaporator.

14. The method of claim 11, wherein the second superheater is disposed upstream of the first superheater.

15. The method of claim 11 comprising receiving the heated flow through the first regions having the first and second superheaters upstream of the second regions having the natural circulation evaporator and the once-through evaporator.

16. The method of claim 11, comprising attemperating the third superheated steam with the second superheated steam in the attemperator to generate the fourth superheated steam.

17. The method of claim 16, comprising superheating the fourth superheated steam using a third superheater.

18. A system, comprising:
instructions disposed on a non-transitory, machine readable medium, wherein the instructions are configured to control a heat recovery steam generator (HRSG) to:
generate a first superheated steam by superheating a first steam generated from a natural circulation evaporator;
generate a second superheated steam by superheating a second steam generated from a once-through evaporator; and
mix the first superheated steam and the second superheated steam in an attemperator to generate a third superheated steam.

19. The system of claim 18, wherein the instructions are configured to maintain a temperature of the third superheated steam above a threshold by adjusting at least one of a first flow rate of the first superheated steam, or a second flow rate of the second superheated steam, or a combination thereof.

20. The system of claim 18, wherein the instructions are configured to generate a fourth superheated steam by superheating the third superheated steam.

21. The system of claim 18, wherein the instructions are configured to control a level in a separating steam drum.

22. The system of claim 18, comprising a controller having the instructions.

23. The system of claim 18, comprising the HRSG having the natural circulation evaporator, the once-through evaporator, a first superheater, and a second superheater.

\* \* \* \* \*